Dec. 1, 1925.  
E. G. HELANDER  
CONDENSER  
Filed May 20, 1921
1,563,981
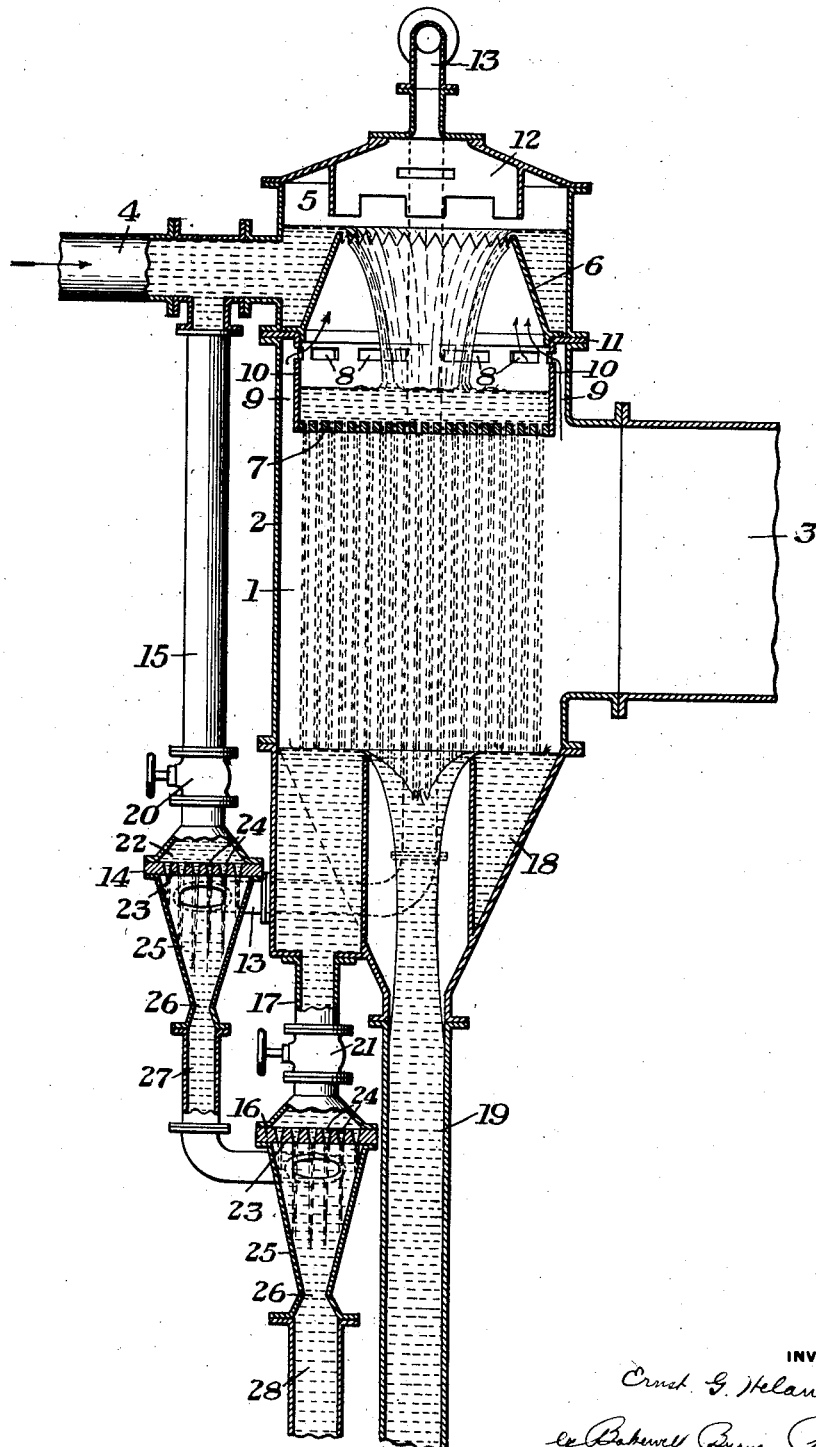
INVENTOR.

Patented Dec. 1, 1925.

1,563,981

UNITED STATES PATENT OFFICE.

ERNST G. HELANDER, OF PHILADELPHIA, PENNSYLVANIA.

CONDENSER.

Application filed May 20, 1921. Serial No. 471,199.

*To all whom it may concern:*

Be it known that I, ERNST G. HELANDER, a citizen of the United States, residing at Philadelphia, in the county of Philadelphia and State of Pennsylvania, have invented a new and useful Improvement in Condensers, of which the following is a full, clear, and exact description.

My invention relates to condensers and is particularly adapted for what are known as reverse flow condensers.

My invention is applicable for use where condensers are desired but it has a special field of application in sugar mills.

An object of my invention is to provide a condenser of the type above indicated which is economical in operation, and which does not require the use of a separate air pump.

A further object of my invention is to provide such a condenser wherein the condensing liquid may be used to automatically eject the air and other non-condensible gases.

A further object of my invention is the provision of such a condenser wherein the liquid which has already been used to condense the condensible vapors is further used in its exit from the condenser to eject the non-condensible gases.

Still another object of my invention is to provide such a condenser wherein the condensing liquid is so divided and directed through the vapor as to secure maximum efficiency of the condensing liquid used.

Other and further objects of my invention will be apparent to those skilled in the art and the condenser in its operation will be better understood by reference to the following description taken in connection with the accompanying drawing which illustrates one embodiment of my invention.

Referring to the drawing, the illustrated embodiment comprises a condensing chamber 1 suitably enclosed by the wall 2. The vapor to be condensed enters the condensing chamber through the passage 3. The condensing liquid is supplied through the conduit 4 which leads into the chamber 5 provided with a conical overflow baffle 6 serated at the top. The liquid flows over the upper edge of the baffle 6 and falls upon a perforated or slotted plate 7 having substantially the same area as the condensing chamber. The openings in the member 7 act to divide the condensing liquid into a plurality of fine streams which fall by gravity downwardly through the vapor which enters through the passage 3.

The condensible vapors are liquefied in the chamber 1 and the non-condensible vapors pass upwardly around the member 7 and through openings 8 in the side thereof into the space above the level of the liquid on the plate 7. This passage of the non-condensible vapors is through an annular space 9 around the member 7, it being noted that the member 7 is carried by a cylindrical member 10 having a flange 11 held in the sides of the condenser wall. By the construction shown, the liquid which enters through the supply conduit 4 is prevented from entering into the space above the member 7 without flowing over the upper edge of the baffle 6. The non-condensible vapors pass through the liquid which flows over the upper edge of this baffle 6, and into an air chamber 12 connected through a pipe 13 with the ejector 14. The ejector 14. The ejector 14 connects through a pipe 15 with a supply of condensing liquid and the exit of the ejector 14 connects with a second ejector 16 which leads to any suitable point such as the usual hot well not shown.

The ejector 16 also connects through a pipe 17 with the chamber 18 at the lower end of the condensing chamber. The tail pipe 19 extends upwardly into the chamber 18 to a suitable point and extends downwardly to any desired point such as the usual hot well. The pipe 15 is provided with a valve 20 and the pipe 17 is likewise provided with a valve 21.

The ejectors 14 and 16 are identical in construction and therefore a description of one will suffice for both. These ejectors each comprise a chamber 22 and a plate 23 having a series of perforations or slots 24 therein. There is a conical chamber 25 below the plate 23 into which the condensing liquid is discharged in fine streams. The chamber 25 decreases downwardly thus forming a constricted portion 26 through which the liquid passes. The pipe 13 which leads from the top of the condenser opens into the conical chamber 25. The liquid issuing from the slots 24 has a head equal to the vertical distance between the plate 23 and the top of the liquid in the condenser. The air and other non-condensible vapors which stand between the jets or streams issuing through the plate 23 are carried downward by friction exerted by the surface of the jets or streams and forced by the velocity of the liquid down through the contracted portion 26. These vapors may be compressed in the conduit 27 and are therefore forced into the second ejector 16 which is constructed similarly to the ejector 14. The liquid from the chamber 18 is supplied to the ejector 16 through the pipe 17, the head being equal to the vertical distance between the plate 23 and the top of the tail pipe 19 in the chamber 18. The vapors forced into the ejector 16 are operated upon by that ejector in the same manner as heretofore described with respect to the ejector 14 and are therefore forced downwardly into the ordinary hot well through the passage 28. The passage 28 may be made of relatively small diameter so as to facilitate the removal of the vapors due to a higher velocity given to the outgoing liquid. That portion of the condensing liquid which is not utilized by the ejector 16 passes out of the condenser through the tail pipe 19 in the ordinary way.

The operation of my condenser as above described is as follows:—

The condensing liquid is admitted through the passage 4 and flows over the babble 6 onto the plate 7 where it is divided and falls by gravity into the chamber 18. The vapor enters through the passage 3 and in the condensing chamber 1 meets with the downward flowing liquid and is condensed except portions which are non-condensible. The non-condensible vapors, including the air, rise up through the annular passage 9 and pass through the openings 8 into the chamber above the liquid level on the plate 7. From there these vapors pass through the condensing liquid flowing over the upper edge of the baffle 6 into a chamber 12 at the top of the condenser. This chamber is connected through the pipe 13 with the ejector 14. The ejector 14 is connected with the point of highest pressure of the condensing liquid. By reason of the action heretofore described in detail the ejector 14 forces the vapors which collect in the chamber 12 downwardly into the second stage ejector 16. This ejector likewise forces these vapors downwardly through the passage 28 to any desired point. A part of the liquid which is collected in the chamber 18 passes through the second stage ejector 16 and the other part passes out in the ordinary way through the tail pipe 19. The above operation is continuous so long as the condenser is in operation.

I have described my condenser and the ejectors in detail but desire it to be understood that I am by no means limited to the exact construction of condenser shown nor am I to be limited to the type of ejectors shown, as any form of ejector which operates on the principle above set forth may be used.

The first stage ejector has been shown connected directly to the condensing liquid supply. This ejector, however, may be connected to any point of the condenser but is preferably connected so as to have the benefit of the highest pressure in the condenser. It will be understood, however, that the ejector 14 may be supplied with liquid independently of the condenser or independently of the source which supplies the condenser. In fact the liquid passing through the first stage condenser may be of a different kind from that used in the condenser, although the usual liquid used for this purpose is water.

While I have explained my invention with two ejectors, my invention has many advantages when only one of the ejectors described is used; for instance, if there is plenty of cool condensing liquid available, and it is not important to heat the outgoing liquid to its full heat absorbing temperature, the first stage ejector may be omitted if a high vacuum is not desired. On the other hand, if a high vacuum is required, the first stage ejector may be used and the second stage ejector omitted.

Further changes may be made in the arrangement without departing from the spirit of my invention.

From the foregoing it will be evident that my condenser has many advantages in that a counter-current condenser is provided wherein the non-condensible vapors are drawn upwardly through a downwardly flowing condensing medium; these vapors are not entrained with the outgoing liquid but are led upwardly and cooled by the descending liquid and are led outside of the condenser and are then ejected through one or more ejectors; in some instances the condensing liquid which has performed its function in the condenser may be used to thus eject the non-condensible vapors; the construction of the condenser is such that maximum efficiency of condensation is secured with extremely simple apparatus; the entire operation including the ejection of the vapors is carried out without any moving parts and therefore the upkeep and maintenance are a minimum.

I claim:

1. A condenser having a vapor inlet, a liquid inlet above said vapor inlet, means dividing the liquid as it flows downwardly, an air chamber above the liquid, and means operated by liquid from said inlet for removing the air from said chamber.

2. A condenser having a vapor inlet, a liquid inlet above said vapor inlet, means dividing the liquid as it flows downwardly, an air chamber above the liquid, an offtake connection leading from said chamber to a point below the liquid inlet, and means operated by the head of liquid from said inlet whereby the air from said chamber is hydraulically ejected by the liquid usable in said condenser.

3. A condenser having a vapor inlet, a water inlet above said vapor inlet, means for dividing the water into small streams throughout substantially the area of the condensing chamber, an air chamber above the liquid inlet, and an annular chamber extending around the water-dividing means and communicating with the condensing chamber and the air chamber.

4. A condenser having a vapor inlet, a condensing chamber, a liquid inlet into said chamber above the vapor inlet, means for subdividing the condensing liquid, a passage around the said subdividing means for the escape of non-condensible vapors, a vapor chamber above said dividing means into which said non-condensible vapors escape, means dividing the condensing liquid through which said condensible vapors pass as the liquid enters said vapor chamber, and means withdrawing the vapor from said chamber.

5. A condenser comprising a condensing chamber, liquid and vapor inlets to said chamber, there being an annular space around said liquid inlet for the escape upwardly of non-condensible vapors from said condensing chamber, an offtake leading from the upper portion of the condenser to a point below the liquid inlet, and a hydraulic ejector below said liquid inlet and operated by a head of liquid at least equal to the difference in elevation between the inlet and ejector, for automatically removing said vapors from said condenser.

6. A condenser comprising a condensing chamber, liquid and vapor inlets to said chamber, there being an annular space around said liquid inlet for the escape upwardly of non-condensible vapors from said condensing chamber, a hydraulic ejector for removing said gases from said condenser, and a second hydraulic ejector connected with said first ejector, said ejectors being operated by liquid under different heads.

7. In a condenser, a condensing chamber having an annular water chamber at its upper portion, the inner wall of said water chamber having its upper edge constructed to effectively break up water passing thereover, a distributing plate on to which such water is adapted to fall, and a vapor inlet below said plate, there being an annular passage around said plate for the upward passage of air, said air being adapted to pass through the water entering the condensing chamber over said upper edge.

8. In a condenser, a condensing chamber having an annular water chamber at its upper portion, the inner wall of said water chamber being upwardly and inwardly inclined and having its upper edge constructed to effectively break up water passing thereover, a distributing plate on to which such water is adapted to fall, and a vapor inlet below said plate, there being an annular passage around said plate for the upward passage of air, said air being adapted to pass through the water entering the condensing chamber over said upper edge.

9. In a condenser, means for introducing condensing liquid to said condenser, a plurality of ejecting means connected in series for withdrawing air from said condenser, and connections to said first-mentioned means for supplying condensing liquid under different heads to said ejecting means.

10. In a condenser, an upper water chamber, means for supplying water thereto, a lower condensate chamber, and separate ejecting means connected in series operatively supplied by water from said chambers.

11. In a condenser, an upper water chamber, means for supplying water thereto, a lower condensate chamber, and separate ejecting means operatively supplied by water from said chambers.

In testimony whereof I have hereunto set my hand.

ERNST G. HELANDER.